United States Patent Office 2,850,532
Patented Sept. 2, 1958

2,850,532

PROCESS FOR THE PRODUCTION OF CYCLOALIPHATIC 1,2-DIAMINES

Charles Simon, Basel, Switzerland, assignor to J. R. Geigy A.-G., Basel, Switzerland, a Swiss firm No Drawing. Application June 12, 1956
Serial No. 590,838

Claims priority, application Switzerland June 16, 1955

5 Claims. (Cl. 260—563)

The present invention is concerned with a new process for the production of cycloaliphatic 1.2-diamines which are, for example, valuable starting materials for pharmaceuticals, pesticides and textile auxiliary agents.

It has now surprisingly been found that cycloaliphatic 1.2-diamines having 6 to 8 ring members in the nucleus carrying both amino groups which correspond to the general formula:

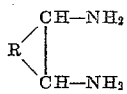

I wherein:

R represents a divalent hydrocarbon radical with valences in the 1.4-, 1.5- or 1.6- positions, which radical, together with the grouping >CH—CH<, forms a cycloalkylene, bicycloalkylene or benzocycloalkenylene radical, can be produced in god yields from the easily accessible α-halogen cycloalkanones of the general formula:

II wherein Hal represents chlorine or bromine and R represents the same divalent hydrocarbon radical as in Formula I.

The reaction is performed in three steps by heating a halogen ketone of the general Formula II in the presence of a hydrogen halide binding agent with urea. The resulting imidazolone of one of the following tautomeric formulae:

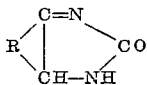

III or

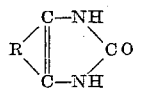

III' is then hydrogenated with catalytically activated hydrogen to form an imidazolidone of the general formula:

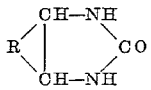

IV which is hydrolysed, advantageously in a mineral acid medium, to form a 1.2-diamino-cycloalkane, -bicycloalkane or -benzocycloalkene or the general Formula I.

In the first step for example an excess of at least half the molar amount of urea used in the reaction can serve as hydrogen halide binding agent. In this case, it is advantageous to use about two mols or more urea to one mol of halogen ketone and the progress of the reaction is followed by observing the formation of carbon dioxide.

The reaction between halogen cycloalkanone and urea generally starts between 50 and 150° and proceeds by itself while generating heat so that generally it is necessary to use an organic solvent or diluent to control its progress. Diethylene glycol ethers such as e. g. diethylene glycol diethyl ether, have proved to be suitable diluents.

Examples of starting materials of the general Formula II are 2-chloro-cyclohexanone, 2-bromo-cyclohexanone, 3-chloro - 1 - methyl - cyclohexanone - (2), 4 - chloro - 1 - methyl - cyclohexanone - (3), 3 - chloro - 1 - methyl-cyclohexanone - (4), 2 - chloro- and 2 - bromo - cycloheptanone, 2-bromo-cyclooctanone, as well as fused halogen cycloalkanones such as e. g. 1-chloro-2-decalone, 3-chloro-2-decalone, 1-chloro- and 1-bromo- tetralone-(2).

Suitable catalysts for the hydrogenation of the polymethylene imidazolones of the general Formula III are e. g. nickel catalysts such as Raney-nickel or nickel on kieselguhr; furthermore, also noble metal catalysts such as e. g. platinum catalysts.

Solvents which can be used in the hydrogenation reaction are e. g. alcohols such as ethanol, propanol. The hydrogen is advantageously introduced under pressure at temperatures of 100–180° until the theoretical amount has been taken up.

The hydrolysis of the imidazolidones to form the desired end products can be performed by means of mineral acid, e. g. 60% sulphuric acid or 70% phosphoric acid. Good yields are obtained.

In contrast to the products obtained by other processes, the cycloaliphatic 1.2-diamines obtained according to the present invention can be converted quantitatively into homogeneous crystallised derivatives. From their behaviour when reacted with compounds having two reactive groups, it can be assumed that the two amino groups are in cis relationship whilst in the main products obtained by other technical processes they are in trans relationship. Thus the process according to the present invention enables compounds to be produced in good yields on a technical scale which up to now have only been difficultly accessible because they were obtained in small quantities as by-products which could be isolated only difficultly.

The following examples serve to illustrate the performance of the new process. Parts are given as parts by weight and their relationship to parts by volume is as that of grammes to cubic centimetres. The temperatures are in degrees centigrade.

Example 1

A mixture of 66 parts of urea and 100 parts by volume of diethylene glycol diethyl ether is heated to 140° until the urea has melted. 66 parts of freshly distilled 2-chlorocyclohexanone are then added dropwise while stirring energetically, the addition being made within 20–30 minutes. In spite of the removal of the heat, the temperature rises towards 150° and carbon dioxide is generated simultaneously. An increasing amount of white crystals can be seen to be forming in the liquid. On the completion of the dropwise addition, the whole is stirred for about half an hour at 140° until no more carbon dioxide is given off. It is then allowed to cool, the semi-liquid reaction mixture is stirred into 200 parts of water and filtered under suction. The filter residue is washed with water and then dried. The crude 4.5-cyclohexaimidazole-2-one (4.5-cyclo-tetramethylene imidazole-2-one) thus obtained is suspended in about 200 parts by volume of abs. alcohol at boiling temperature and then the suspension is cooled and filtered.

If desired, this previously purified product can be recrystallised from abs. ethanol whereupon it melts at 290–300° on decomposition.

The hydrogenation is performed by suspending 28 parts of 4.5-cyclohexaimidazole-2-one in 200 parts by volume of abs. ethanol, adding 10 parts of Raney nickel and introducing hydrogen at a temperature of 135–145° under 120–125 atmospheres pressure until the amount taken up corresponds to the theoretical amount. The catalyst is then filtered off, the solvent evaporated off and the residue is distilled in the vacuum. The 4.5-cycloheximidazolidone (N.N'-cyclohexylene urea) passes over at 218–220° under 14 mm. pressure (M. P. 149–150°).

To hydrolyse, 14 parts of N.N'-cycloheximidazolidone are heated while stirring with 30 parts of 60% sulphuric acid. Carbon dioxide slowly begins to develop at 95° and is intensively generated at 105°. The reaction continues for about an hour at this temperature until no more carbon dioxide is generated and the reaction mixture is a clear solution. After cooling, the reaction is carefully made alkaline with caustic soda lye while externally cooling (e. g. with 80 parts of 31.5% lye) and the base which separates is extracted with ether. The ether extract is evaporated and distilled over 3–4 parts of sodium hydroxide. The sterically homogeneous 1.2-diamino-cyclohexane so obtained in a yield of 75–80% is a colourless, liquid product which easily dissolves in water. It boils at 70–73° under 11 mm. pressure and is a great absorbent of carbon dioxide.

*Example 2*

In an analogous manner, cycloheptimidazole-2-one (4.5 cyclopentamethylene imidazole-2-one) (M. P. 310–320° from isopropanol on decomposition) is obtained by using 73 parts of 2-chloro-cycloheptanone (B. P.$_{14}$ 96–98°) and 66 parts of urea in 110 parts of diethylene glycol diethyl ether. This product can be hydrogenated as described above to form 4.5-cycloheptimidazolidone (N.N'-cycloheptylene urea) which melts at 253° (from methanol).

31 parts of the above imidazolidone and 60 parts of 65% sulphuric acid are stirred for about 15 hours at 135–145° inner temperature. The generation of carbon dioxide is practically completed after this time. The reaction mixture is cooled, diluted with 40 parts of water and the reaction is made alkaline with concentrated caustic soda lye whereupon the 1.2-diamino-cycloheptane separates as an oil. It is extracted with ether, the extract is dried with sodium sulphate, evaporated and the residue is distilled over sodium hydroxide. The 1.2-diamino-cycloheptane boils at 106–107° under 23 mm. pressure and is obtained from cycloheptimidazolidone in a yield of about 80%.

*Example 3*

32 parts of chloro-2-decalone (M. P. 108–110°) (produced by chlorinating 2-decalone) are heated with 23 parts of urea in 200 parts by volume of diethylene glycol diethyl ether to an inner temperature of 135–140°. Carbon dioxide is generated and after a short time, a white reaction product begins to crystallise out. The generation of carbon dioxide is completed after 4–5 hours. The reaction mixture, which is of a thick consistency, is cooled to room temperature, filtered, the residue is stirred with hot water, again filtered, the residue is washed with water and finally dried. 27 parts of octahydro-naphthimidazole-2-one are obtained in the form of a yellowish powder. It becomes white on recrystallisation from ethanol. It then decomposes at about 256–260°.

The imidazolone so obtained is pasted in 200 parts of abs. ethanol, 10 parts of Raney-nickel are added and the whole is hydrogenated at 130–150° under 120 atm. pressure. An over 90% yield of octahydro-naphthimidazolidone (M. P. 159–160° recrystallised from ethyl acetate) can be isolated from the solution obtained. By boiling the imidazolidone obtained with 60% sulphuric acid, a good yield of 1.2-diamino-decalin is obtained as a colourless strongly basic liquid, B. P.$_{0.02}$ 87°.

What I claim is:

1. A process for the manufacture of a cycloaliphatic 1.2-diamine corresponding to the formula

(I)

from a halogen ketone of the formula

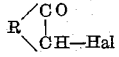

which comprises heating the said halogen ketone with urea at 50–150° C. in the presence of a hydrogen halide binding agent, hydrogenating the resultant imidazolone corresponding to one of the formulae

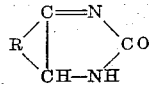

and

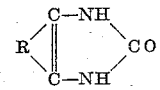

by means of hydrogen in the presence of a nickel catalyst until sufficient hydrogen has been taken up to form an imidazolidone of the formula

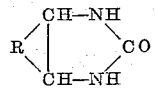

and hydrolysing the said imidazolidone in a mineral acid medium to form the corresponding cycloaliphatic 1.2-diamine, R throughout representing a divalent hydrocarbon radical forming together with the grouping

of Formula I a member selected from the class consisting of cycloalkylene, bicycloalkylene and benzocycloalkylene radicals.

2. A process for the manufacture of a cycloaliphatic 1.2-diamine corresponding to the formula

(I)

from a halogen ketone of the formula

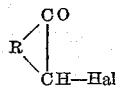

which comprises the step of heating the said halogen ketone with urea at 50–150° C. in the presence of a hydrogen halide binding agent, thereby producing an imidazolone corresponding to one of the formulae

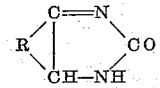

and

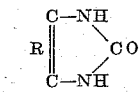

which is convertible into the said cycloaliphatic 1.2-diamine by hydrogenation in the presence of nickel catalyst followed by mineral acid hydrolysis of the resulting imidazolidone, R throughout representing a divalent hydrocarbon radical forming together with the grouping

of Formula I a member selected from the class consisting of cycloalkylene, bicycloalkylene and benzocycloalkylene radicals.

3. A process for the manufacture of 1.2-diaminocyclohexane which comprises heating 1 mole of 2-chlorocyclohexanone with 2 moles of urea at a temperature of 140–150°, hydrogenating the compound obtained with catalytically activated hydrogen and hydrolysing the resultant N.N'-cyclohexinimidazolidone with the aid of sulphuric acid.

4. A process for the manufacture of 1.2-diaminocycloheptane which comprises heating 1 mole of 2-chlorocycloheptanone with 2 moles of urea at a temperature of 140–150°, hydrogenating the compound obtained with catalytically activated hydrogen and hydrolysing the resultant 4.5-cycloheptimidazolidone with the aid of sulphuric acid.

5. A process for the manufacture of 1,2-diaminodecalin which comprises heating 1 mole of chloro-2-decalone with two moles of urea at a temperature of 135–140°, hydrogenating the obtained compound with catalytically activated hydrogen and hydrolysing the resultant octahydro-naphthimidazolidone with the aid of sulphuric acid.

References Cited in the file of this patent
FOREIGN PATENTS 649,981    Great Britain _____ Feb. 7, 1951